(12) United States Patent
Homma

(10) Patent No.: US 8,107,087 B2
(45) Date of Patent: Jan. 31, 2012

(54) DIMPLE POSITION DETECTION DEVICE AND DIMPLE POSITION DETECTION METHOD FOR DISK DRIVE SUSPENSION

(75) Inventor: Akira Homma, Komagane (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 254 days.

(21) Appl. No.: 12/469,920

(22) Filed: May 21, 2009

(65) Prior Publication Data

US 2009/0310454 A1  Dec. 17, 2009

(30) Foreign Application Priority Data

Jun. 11, 2008  (JP) ................................. 2008-153118

(51) Int. Cl.
*G01N 11/14*  (2006.01)
(52) U.S. Cl. ........................................................ 356/614
(58) Field of Classification Search .................. None
See application file for complete search history.

(56) References Cited

U.S. PATENT DOCUMENTS

| 7,053,362 | B2 * | 5/2006 | Tobiason et al. | 250/231.16 |
| 7,138,629 | B2 * | 11/2006 | Noji et al. | 250/311 |
| 7,576,769 | B2 | 8/2009 | Hayami et al. | |

FOREIGN PATENT DOCUMENTS

| CN | 1612222 A | 5/2005 |
| JP | 2002-32738 A | 1/2002 |
| JP | 2006-308425 A | 11/2006 |

OTHER PUBLICATIONS

Chinese Office Action dated Dec. 16, 2010 (and English translation thereof) in counterpart Chinese Application No. 200910146160.6.
Chinese Office Action dated May 11, 2010 and English translation thereof, issued in counterpart Chinese Application No. 200910146160.6.

\* cited by examiner

*Primary Examiner* — Tu Nguyen
(74) *Attorney, Agent, or Firm* — Holtz, Holtz, Goodman & Chick, PC

(57) ABSTRACT

A dimple position detection device for detecting a position of a dimple formed on a load beam is provided with an illumination device, imaging device, and image processing section. The illumination device directs illumination light toward the dimple. The imaging device receives reflected light from the dimple. The image processing section binarizes an image obtained by the imaging device. The image processing section maximizes a binarization level, binarizes the reflected light image, determines whether an area of a light spot region or on-region above the binarization level has a predetermined value, reduces the binarization level when the area of the light spot region is less than the predetermined value, and calculates the gravitational position of the light spot region with the predetermined value reached by the light spot region area.

1 Claim, 7 Drawing Sheets

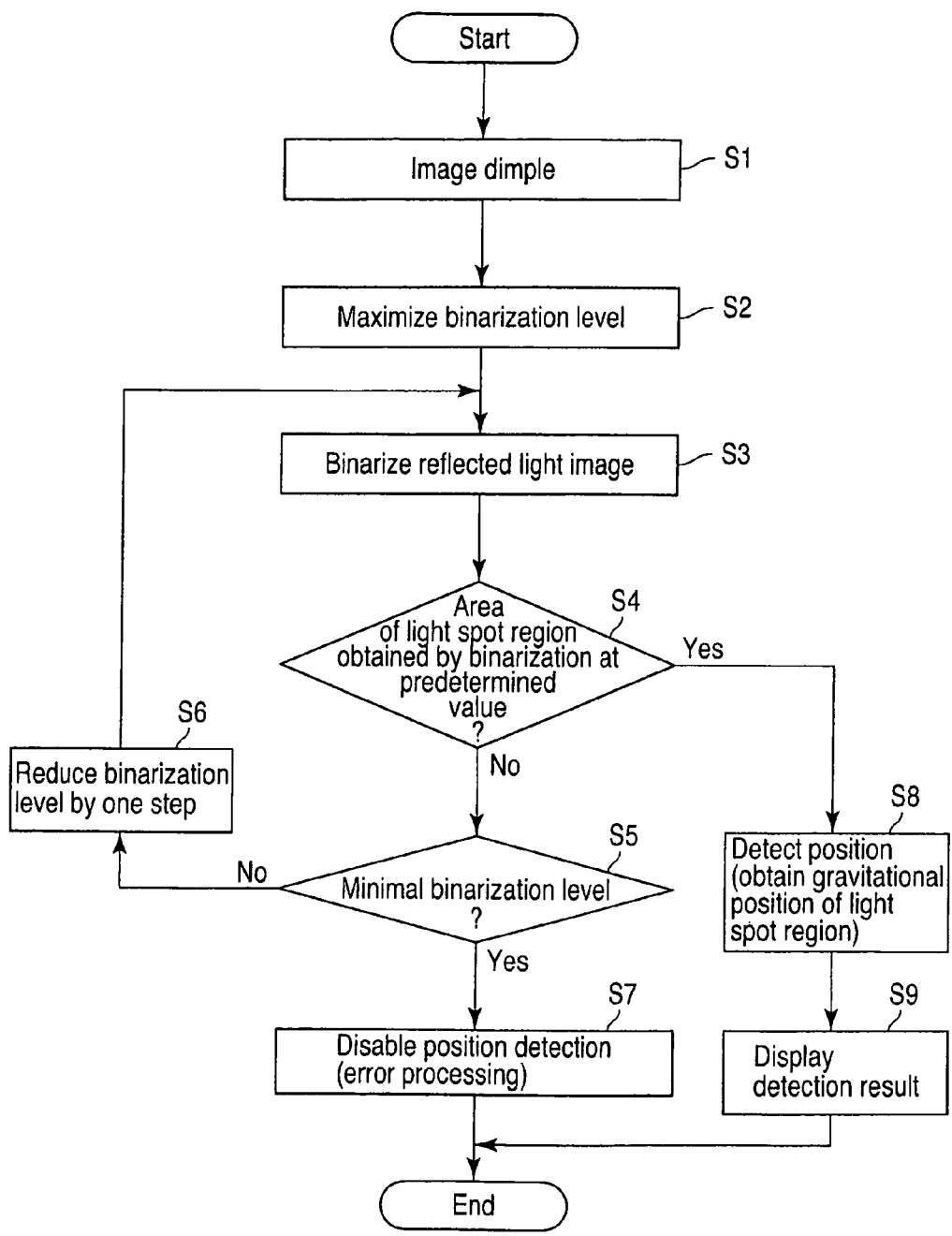
F I G. 4

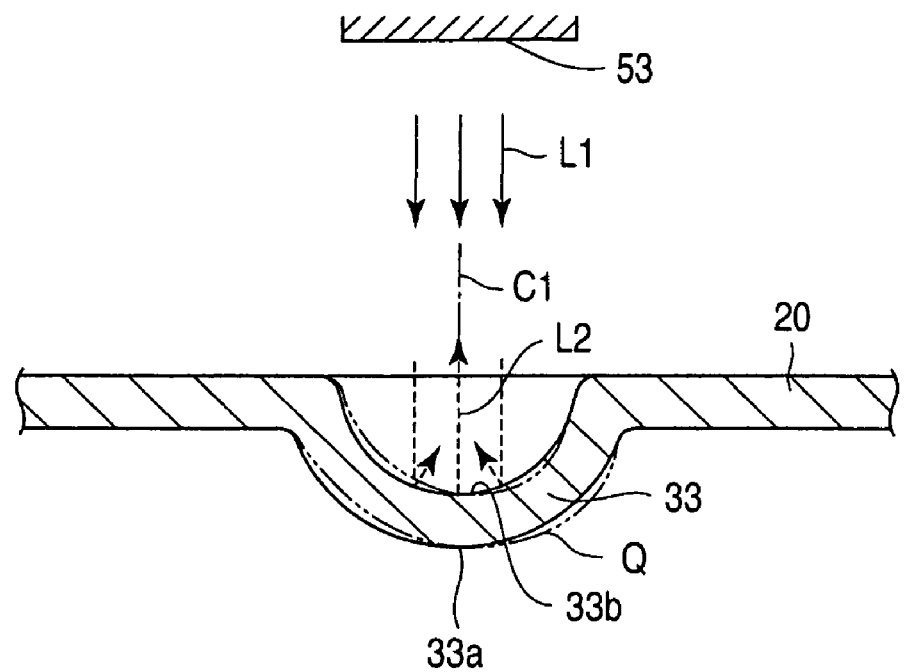
F I G. 5
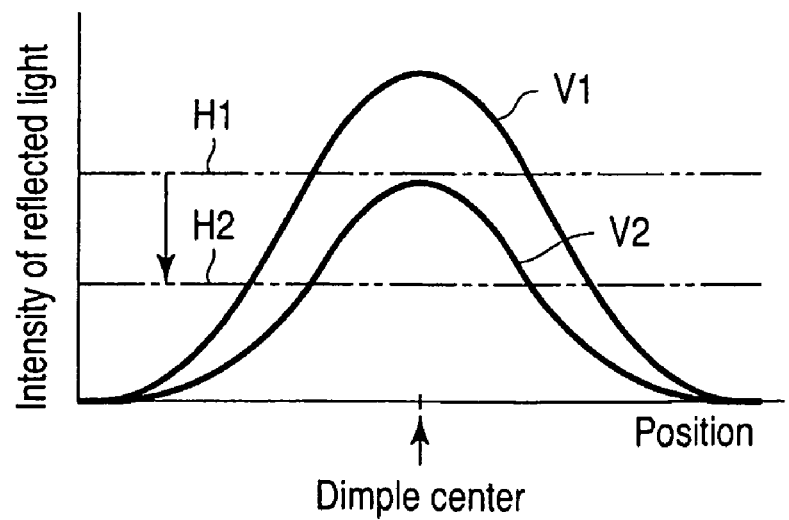
F I G. 6

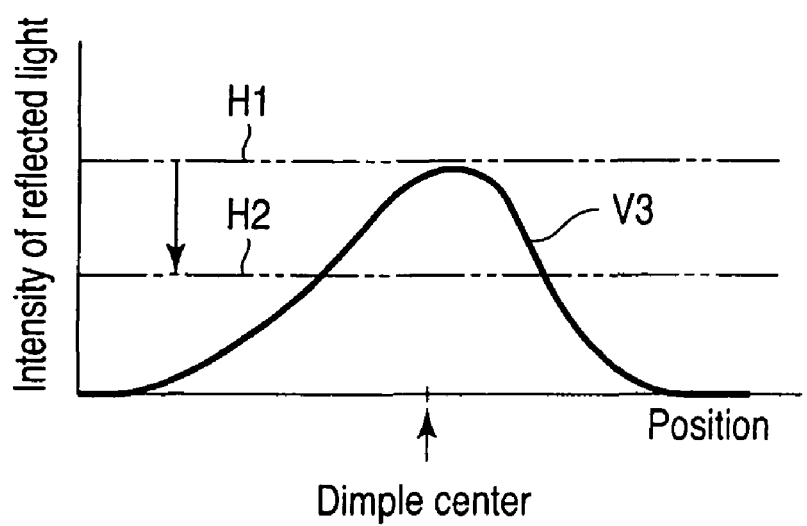
F I G. 7
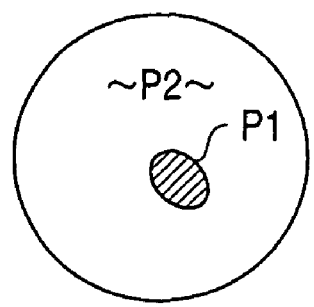
F I G. 8

US 8,107,087 B2

DIMPLE POSITION DETECTION DEVICE AND DIMPLE POSITION DETECTION METHOD FOR DISK DRIVE SUSPENSION

CROSS-REFERENCE TO RELATED APPLICATIONS

This application is based upon and claims the benefit of priority from prior Japanese Patent Application No. 2008-153118, filed Jun. 11, 2008, the entire contents of which are incorporated herein by reference.

BACKGROUND OF THE INVENTION

1. Field of the Invention

This invention relates to a device and a method for detecting the position of a dimple of a disk drive suspension incorporated in, for example, a hard disk drive (HDD).

2. Description of the Related Art

A hard disk drive for writing and reading data to and from a magnetic disk includes a disk drive suspension (hereinafter simply referred to as the suspension) and a magnetic head disposed on the distal end portion of the suspension. The suspension is mounted on an actuator arm of a carriage. The suspension is provided with a base plate, load beam, flexure, etc. The flexure is fixed on the load beam. A gimbal portion including a tongue portion is formed on a part of the flexure. A slider that constitutes the magnetic head is mounted on the tongue portion.

A dimple is formed on the distal end portion of the load beam by stamping. The dimple projects substantially in a hemisphere toward the tongue portion of the flexure, and its top is in contact with the tongue portion. The reverse surface of the dimple is concave. The slider fixed on the tongue portion swings in a rolling or pitching direction around the dimple top. It is necessary, therefore, to accurately ascertain the position of the dimple (especially, the dimple top).

A device for measuring the respective positions of components of the suspension is disclosed in, for example, Jpn. Pat. Appln. KOKAI Publication No. 2006-308425 (Patent Document 1). Once the flexure is fixed to the load beam, in a manufacturing process for the suspension, the dimple is located on the reverse side of the tongue portion. Thus, the detection device described in Patent Document 1 cannot optically detect the position of the dimple top.

Even though the flexure is fixed to the load beam, the reverse side (concave surface) of the dimple can be optically observed without being hindered by the flexure. Thereupon, the inventors hereof hit upon an idea to detect the dimple position by irradiating the dimple with illumination light from behind it. Specifically, light reflected by the reverse surface of the dimple is imaged, and image processing is performed for binarization. Then, the position of the dimple top is obtained based on a light spot region obtained by the binarization.

If the shape of the dimple is distorted or if the dimple surface is rough, however, a light spot region (on-region) above a binarization level cannot be obtained, in some cases. If the reflected light is weak, therefore, dimmer control is performed such that the illumination light is intensified to intensify the reflected light in order to obtain a light spot region above the binarization level.

However, investigation by the inventors hereof revealed that the position of the dimple top cannot be accurately detected, depending on the conditions of the dimple, if the dimple position is obtained based on the dimmer control. If the dimple shape is distorted, in particular, a detected position (apparent position) of the dimple top may be considerably deviated from an actual dimple top position, in some cases. The reason for this will be described below.

The dimple is formed by striking and plastically deforming a part of the load beam by means of a precision press tool. As the pressing frequency increases, therefore, the tool may be worn or deformed, or its molding surface may be roughened. Thereupon, the dimple shape or surface may become irregular or rough.

Ideally, the dimple has the dome shape of a circular-arc rotor (substantially hemispherical) such that its top is located on its center. In this case, the illumination light directed toward the reverse surface of the dimple from the reverse side thereof is reflected by the reverse side of the dimple top and directed straight to an imaging element. Thus, a peak of the reflected light appears in a position corresponding to the dimple center, as indicated by reflected light distribution A typically shown in FIG. 9, for example. If this reflected light is weak, reflected light distribution A may sometimes fail to exceed a binarization level SH1. In such a case, reflected light distribution B above the binarization level SH1 can be obtained by intensifying the illumination light, and hence, the reflected light.

The "dimple center" as stated herein implies the center of a circular contour of the dimple, as viewed from above the load beam. On the other hand, the "dimple top" is that part of the obverse surface (convex surface) of the dimple which projects farthest toward the tongue portion. If the dimple is distorted, the dimple top may be deviated from the dimple center, in some cases.

If the dimple top is deviated from the dimple center, a peak of the reflected light appears in a position off the dimple center, as indicated by reflected light distribution A' typically shown in FIG. 10, for example, and distribution A' is bilaterally asymmetrical. If reflected light distribution A' is below the binarization level SH1, reflected light distribution B' above the binarization level SH1 can be obtained by intensifying the illumination light. If the illumination light is intensified, however, a peak of reflected light distribution B' is inevitably further deviated from the dimple center, as indicated by arrow D in FIG. 10. Therefore, an apparent position of the dimple top obtained based on this light spot region is deviated from the actual dimple top position by ΔC. Thus, the top position cannot be accurately detected, depending on the conditions of the dimple.

BRIEF SUMMARY OF THE INVENTION

The present invention provides a dimple position detection device capable of accurately detecting the position of a dimple top.

A dimple position detection device of the invention comprises an illumination device which directs illumination light toward an obverse or reverse surface of a dimple, an imaging device which acquires an image of light reflected by the obverse or reverse surface of the dimple, and an image processing section which processes the image acquired by the imaging device, the image processing section including means for binarizing the image of the reflected light, means for changing a binarization level so that an area of a light spot region obtained by the binarization has a predetermined value, and means for obtaining a position of a dimple top based on the light spot region when the predetermined value is reached by the area of the light spot region.

According to this arrangement, the light spot region is obtained by changing the binarization level in accordance with the intensity of the light reflected by the obverse or reverse surface of the dimple. When the area of the light spot region reaches the predetermined value, the position of the dimple top is obtained based on the light spot region. Therefore, the position of the dimple top can be accurately detected even if it is deviated from the dimple center because of, for example, irregularity of the dimple shape. Thus, according to the present invention, the light spot region can be kept more easily from being deviated from an actual position of the dimple top than in the case of conventional light control where the illumination light is intensified.

Further, a dimple position detection method of the invention is a method for detecting a position of a dimple formed on a load beam of a disk drive suspension and comprises a step of directing illumination light toward an obverse or reverse surface of the dimple and acquiring an image of light reflected by the obverse or reverse surface of the dimple, a step of maximizing a binarization level, a step of binarizing the image of the reflected light, a step of comparing an area of a light spot region obtained by the binarization with a predetermined value, a step of reducing the binarization level and advancing to the binarization step when the area of the light spot region is less than the predetermined value, a step of obtaining a position of a dimple top based on the light spot region when the area of the light spot region has the predetermined value, a step of displaying a result of detection of the dimple position, and a step of performing error processing when the binarization level is minimal with the predetermined value not reached by the area of the light spot region.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a flowchart showing an example of a flow of processing by the dimple position detection device shown in FIG. 3;

FIG. 5 is a view typically showing a profile of a dimple, illumination light, and reflected light;

FIG. 6 is a diagram typically showing reflected light distributions and binarization levels with a top of the dimple on the dimple center;

FIG. 7 is a diagram typically showing a reflected light distribution and the binarization levels with the dimple top off the dimple center;

FIG. 8 is a view showing an example of a light spot region of the binarized reflected light;

DETAILED DESCRIPTION OF THE INVENTION

One embodiment of the present invention will now be described with reference to FIGS. 1 to 8.

Figure 1:
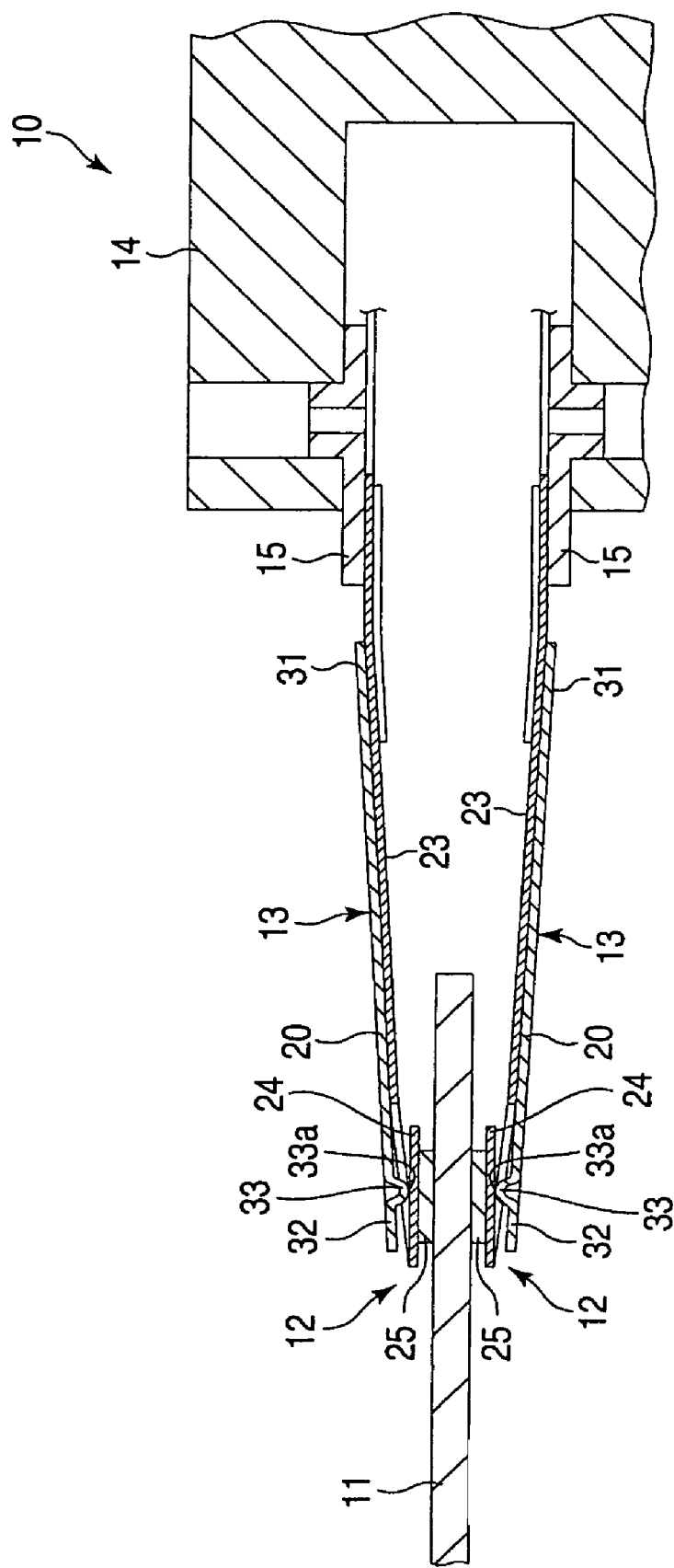
FIG. 1 is a partial sectional view of a disk drive with a suspension.

A hard disk drive (HDD) 10 shown in FIG. 1 includes a disk 11 for use as a recording medium, suspensions 13, and arm (actuator arm) 14. A head portion 12 is mounted on each suspension 13. The suspensions 13 are mounted on the arm 14. Each head portion 12 has a function to magnetically access (write or read) data on a recording surface of the disk 11.

Figure 2:
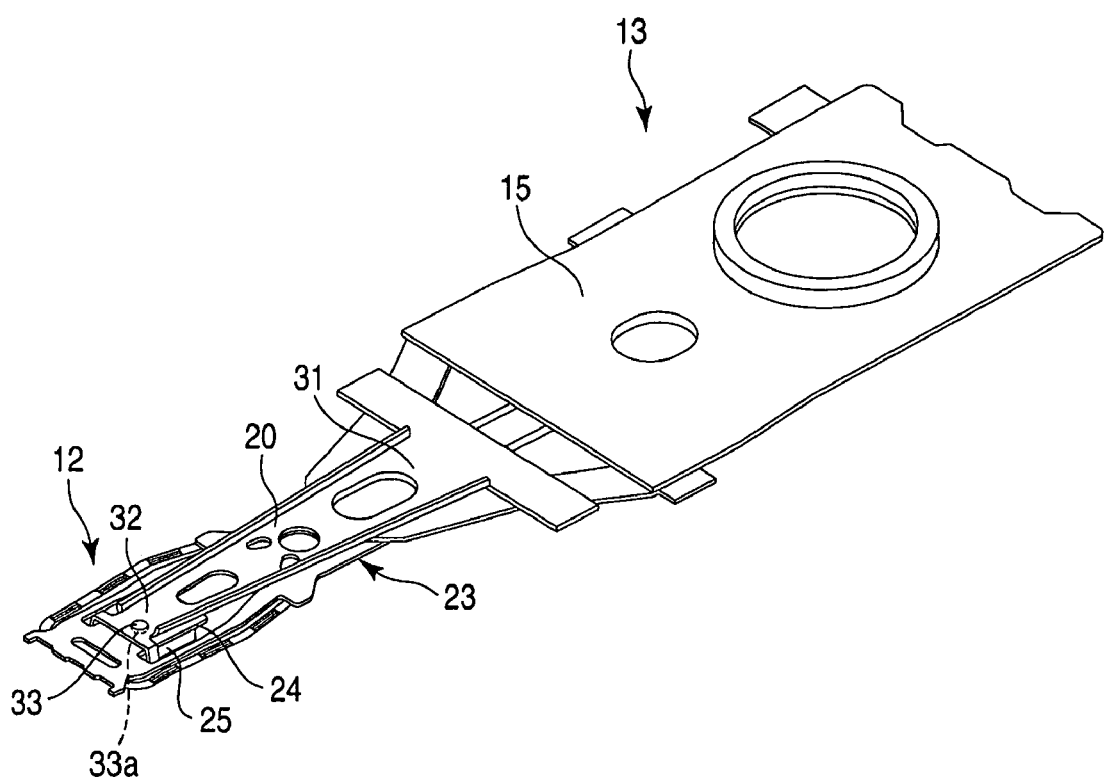
FIG. 2 is a perspective view of the suspension shown in FIG. 1.

FIG. 2 shows an example of the suspension 13. The suspension 13 is provided with a base plate portion 15, load beam 20, flexure 23 mounted on the load beam 20, etc. The flexure 23 is fixed superposed on the load beam 20 by laser spot welding or the like.

A gimbal portion including a tongue portion 24 that functions as a movable part is formed near the distal end portion of the flexure 23. A slider 25 is mounted on the tongue portion 24. The slider 25 is a component of the head portion 12. When the disk 11 rotates at high speed, air that flows between the disk 11 and slider 25 forms an air bearing, and the slider 25 slightly flies above the surface of the disk 11. The elevation of the flown slider 25 is called the flying height.

The load beam 20 has a proximal portion 31 and distal end portion 32. A dimple 33 is formed near the distal end portion 32 of the load beam 20. The surface of the dimple 33 is a substantially hemispherical convex surface. The dimple 33 projects toward the tongue portion 24 of the flexure 23. A top 33a of the dimple 33 is in contact with the tongue portion 24. The tongue portion 24, along with the slider 25, is swingable around the top 33a of the dimple 33. The reverse side of the dimple 33 is depressed to form a substantially hemispherical concave surface.

If the top 33a of the dimple 33 is not located on the transverse center of the slider 25, the torsional torque of the tongue portion 24 varies. If the torsional torque of the tongue portion 24 varies, it adversely affects the flying height of the slider 25. The dimple 33 is used to evaluate the positional accuracy of the flexure 23 with respect to the load beam 20 in inspecting the suspension 13 after assembly. In some cases, moreover, the dimple 33 may be used as a position reference in mounting the slider 25 on the tongue portion 24. Therefore, it is important to detect the position of the dimple 33 accurately.

Figure 3:
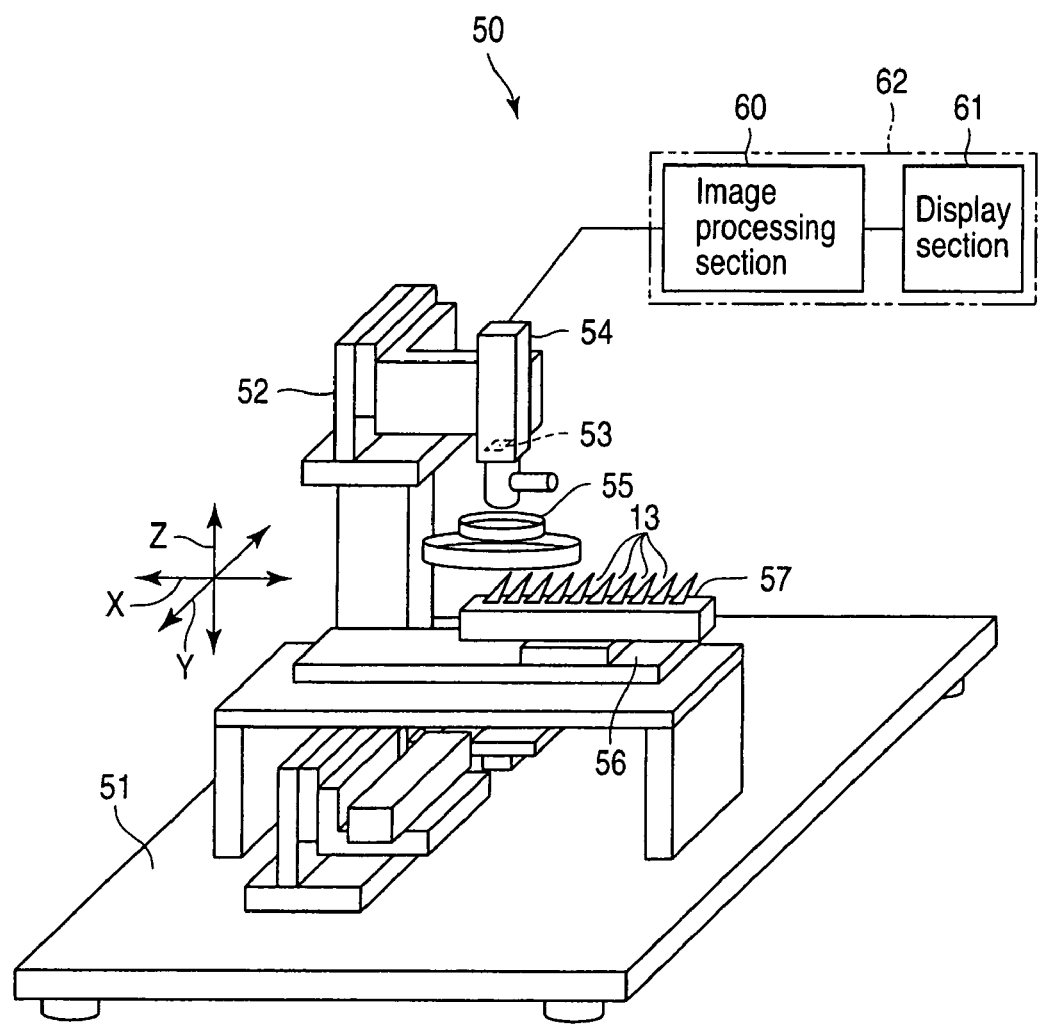
FIG. 3 is a perspective view of a dimple position detection device according to one embodiment of the invention.
Figure 9:
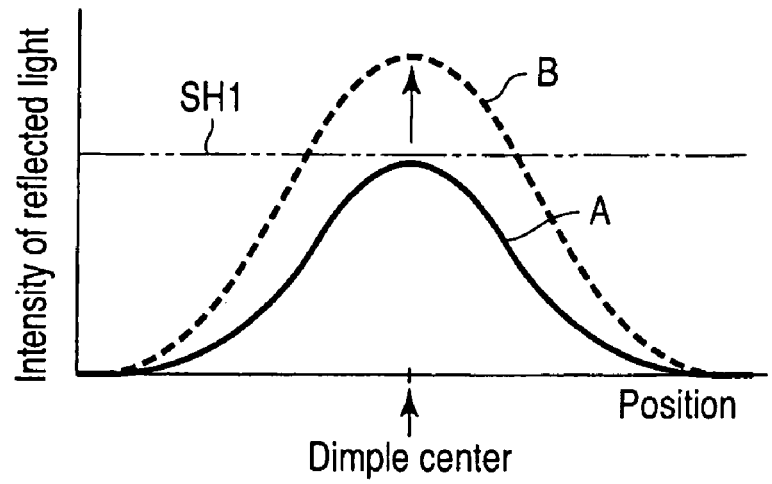
FIG. 9 is a diagram typically showing a reflected light distribution obtained when the illumination light is intensified with the dimple top on the dimple center.
Figure 10:
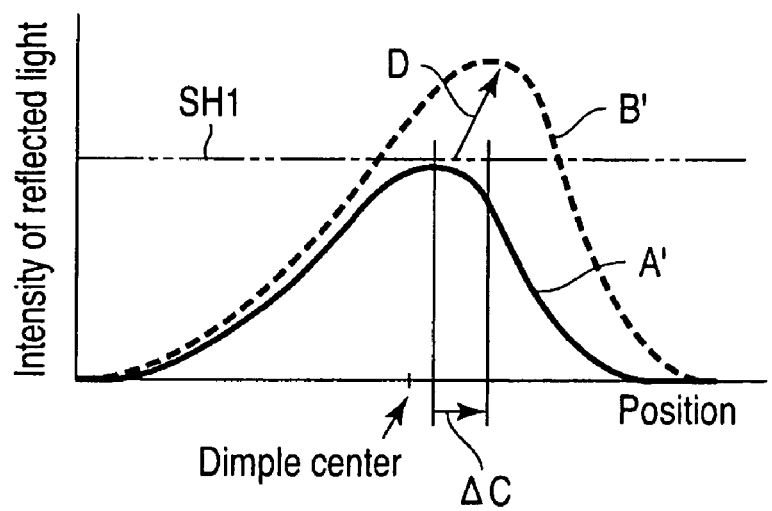
FIG. 10 is a diagram typically showing a reflected light distribution obtained when the illumination light is intensified with the dimple top off the dimple center.

FIG. 3 typically shows an example of a dimple position detection device 50 for detecting the position of the dimple 33. The detection device 50 is provided with a table 51, liftable frame 52, camera 54 having an imaging element 53, and illumination device 55. The table 51 functions as a pedestal. The liftable frame 52 is movable in directions indicated by arrows Y and Z in FIG. 3. The camera 54 is mounted on the liftable frame 52. The camera 54 is an example of an imaging device.

The illumination device 55 is provided with an illumination system based on ring illumination, half mirrors, etc. The illumination device 55 irradiates a back surface 33b (FIG. 5) of the dimple 33 with illumination light L1. The illumination light L1 is directed along an axis C1 of the dimple 33.

The dimple position detection device 50 is provided with a slide member 56, workpiece fixing jig 57, image processing section 60, display section 61, etc. The slide member 56 is movable in the direction of arrow X. The workpiece fixing jig 57 is mounted on the slide member 56. The image processing section 60 may be formed using a part of an information processor 62 that has a computing function, such as a personal computer. The image processing section 60 is electrically connected to the imaging element 53.

A plurality of suspensions 13 as workpieces to be inspected are held in predetermined positions on the workpiece fixing jig 57. These suspensions 13 are arranged at regular intervals in the X-direction. The slide member 56 is movable in the X-direction by a servomotor (not shown). The slide member 56 is moved in the X-direction as the respective dimple positions of the suspensions 13 are detected one after another.

Procedural steps for detecting the position of the dimple 33 by means of the dimple position detection device 50 will now be described with reference to FIGS. 4 to 8.

In Step S1 shown in FIG. 4, illumination light from the illumination device 55 is directed to the vicinity of the dimple 33 of the suspension 13 on the reverse side of the dimple 33. The resulting reflected light is imaged by the imaging element 53.

As shown in FIG. 5, the illumination light L1 directed toward the back surface 33b of the dimple 33 is reflected by the back surface 33b of the dimple 33 and made incident on the imaging element 53 of the camera 54. Thus, the light reflected near the back surface 33b of the dimple 33 is imaged by the imaging element 53. Obtained image data is converted into an electrical signal and sent to the image processing section 60. The following processing is performed in the image processing section 60.

First, a binarization level (threshold value) is maximized in Step S2. Then, the procedure advances to Step S3. In Step S3 for binarization, an image of the reflected light is binarized by being processed based on the binarization level and a given algorithm. Specifically, the obtained image of the reflected light is processed so that a part thereof above the binarization level serves as a light spot region (on-region), and the other region serves as an off-region. Then, the procedure advances to Step S4.

In Step S4, the area of the light spot region (on-region) obtained by the binarization is compared with a preset or predetermined value. If the area of the light spot region is less than the predetermined value, the procedure advances to Step S5. The procedure advances to Step S8 if the light spot region above a binarization level H1 is obtained and if its area has the predetermined value, as indicated by reflected light distribution V1 typically shown in FIG. 6, for example.

If it is determined in Step S4 that the light spot area does not have the predetermined value, the procedure advances to Step S5. In Step S5, it is determined whether or not the binarization level is minimal. If it is determined in Step S5 that the binarization level is not minimal, the procedure advances to Step S6.

In Step S6, processing for reducing the binarization level is performed. If the binarization level H1 is not reached by the reflected light, as indicated by reflected light distribution V2 shown in FIG. 6, for example, the binarization level is reduced by one step in Step S6, whereupon the procedure returns to Step S3. In this manner, the binarization level is gradually reduced so that the predetermined value is reached by the area of the light spot region. Thus, even with relatively weak reflected light distribution V2, the area of the light spot region reaches the predetermined value when the binarization level is reduced to, for example, a position H2 shown in FIG. 6.

If it is determined in Step S5 that the binarization level is minimal, the binarization level cannot be reduced any more. Accordingly, it is determined that the dimple position cannot be detected, and the procedure advances to Step S7, in which error processing is performed (e.g., an alarm is generated). Thereupon, the procedure terminates.

If it is determined in Step S4 that the light spot area has the predetermined value, the procedure advances to Step S8. In Step S8, the position of the top 33a of the dimple 33 is calculated, based on the given algorithm and the light spot region obtained by the aforementioned binarization. The position of the top 33a of the dimple 33 is obtained by, for example, detecting the gravitational position of the light spot region. Alternatively, the position of a light peak in the light spot region may be regarded as the top position of the dimple 33. Alternatively, moreover, the position of the dimple top may be specified by processing the light spot region by some other method.

As shown in FIG. 5, the dimple 33 has the shape of a circular-arc rotor (substantially hemispherical bowl or dome) that centers on the axis C1, and its top 33a is ideally located on the center of the dimple 33. In this case, the illumination light L1 directed along the axis C1 is reflected by the back surface 33b of the top 33a of the dimple 33. Since reflected light L2 is directed along the axis C1 toward the imaging element 53, a peak of the reflected light appears on the center of the dimple 33, as shown in FIG. 6.

If the shape of the dimple 33 is distorted as indicated by two-dot chain lines Q in FIG. 5, however, the position of the top 33a is deviated from the center of the dimple 33. As typically shown in FIG. 7, therefore, reflected light distribution V3 is not bisymmetrical, and the light peak is deviated from the center of the dimple 33. If the illumination light is intensified so that the region (on-region) in which the binarization level is exceeded can be obtained, in this case, the gravitational position of the light is inevitably deviated from the top 33a of the dimple 33.

According to the present embodiment, as mentioned before, the binarization level is reduced depending on the intensity of the reflected light, and the obtained area of the light spot region is adjusted to the predetermined value. By doing this, the light spot region that is needed to detect the position of the top 33a of the dimple 33 can be obtained without dislocation. The position of the dimple top can be accurately obtained based on the light spot region. FIG. 8 shows an example of a light spot region P1 (on-region) obtained by binarization and an example of the other region or off-region P2.

The information processor 62 is used to determine whether or not the position of the top 33a of the dimple 33 detected in this manner is within an allowable range. The dimple position thus obtained, the result of the determination, etc., are displayed by the display section 61 in Step S9. If the position of the top 33a of the dimple 33 is not within the allowable range, the display section 61 displays a message or warning to alert an operator or the like.

If the reflected light is weak, according to the present embodiment, as described above, the light spot region with a predetermined area can be obtained by changing the binarization level without intensifying the illumination light. Thus, such a shift of the light spot region as is the case with the intensified illumination light does not occur, so that the position of the dimple top can be accurately detected from the reverse side of the dimple.

Before the flexure is fixed to the load beam, according to the present invention, the dimple position can be detected from the obverse side (convex side) of the dimple by directing the illumination light from the obverse side and imaging the resulting reflected light. It is to be understood, in carrying out the invention, that the components of the dimple position detection device, including the illumination device, imaging device, and image processing section, may be embodied in modified forms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for detecting a position of a dimple formed on a load beam of a disk drive suspension, the dimple having substantially a dome shape of a circular-arc rotor such that a top of the dimple is substantially located on a center of the dimple, the method comprising:

directing illumination light toward an obverse or reverse surface of the dimple along an axis of the dimple, and acquiring an image of light reflected along the axis of the dimple by the obverse or reverse surface of the dimple, wherein the reflected light has a peak which appears in a position corresponding to the top of the dimple;

maximizing a binarization level;

binarizing the image of the reflected light;

comparing an area of a light spot region obtained by the binarization with a predetermined value;

reducing the binarization level and binarizing the image of the reflected light, when the area of the light spot region is less than the predetermined value;

obtaining the position of the dimple top based on the light spot region when the area of the light spot region has the predetermined value;

displaying a result of detection of the dimple position; and performing error processing when the binarization level is minimal and the predetermined value is not reached by the area of the light spot region, in a state where a shape or surface of the dimple is irregular or rough.

* * * * *